United States Patent Office 3,763,095
Patented Oct. 2, 1973

3,763,095
CHEMICALLY CROSS LINKED POLYETHYLENE STABILIZED WITH BIS(DIMETHYLPHENOL) SULFIDES
Anthony Di Battista, Eastchester, N.Y., assignor to Ciba-Geigy Corporation, Ardsley, N.Y.
No Drawing. Filed Dec. 21, 1971, Ser. No. 210,603
Int. Cl. C08f 45/58
U.S. Cl. 260—45.85 H    10 Claims

ABSTRACT OF THE DISCLOSURE

Cross-linked polyethylene, especially those cross-linked with peroxides, can be successfully stabilized without interfering with the cross-linking, by incorporating therein bis(3,5-dimethyl-4-hydroxyphenyl)sulfides. Other additives, such as synergists, metal deactivators, pigments, carbon black and the like may also be present. Chemically cross-linked polyethylene is particularly useful as an insulation for high voltage power cables.

BACKGROUND OF THE INVENTION

Chemically cross-linked polyethylene is an important item of commerce since it possesses physical properties which make it useful for many applications. Polyethylene cross-linked with peroxides such as dicumyl peroxide no longer exhibits a melting point and is therefore suitable for high temperature service, particularly as an insulation for high voltage power cables. The cross-linking allows the resin to sustain a continuous operating temperature of about 90° and relatively high temperatures for short intervals of overload operation. The cross-linking also provides crush and cut-through resistance at points of support of the wire cables.

In order that the cross-linked polyethylene can maintain good physical properties over a long period of time, it is necessary to incorporate therein a stabilizer which is essential to protect the polymer against thermal degradation and/or premature gel formation during processing as well as against oxidative degradation during high temperature service. A candidate stabilizer, however, must be able to meet certain important prerequisites to be useful in chemically cross-linked polyethylene. Such a stabilizer should:

(a) have little or no adverse effect on curing of the resin after compounding of the additives (peroxide, carbon black, pigment, filler, etc.),
(b) survice the cross-linking operation sufficiently to provide end-use stabilization,
(c) not affect the electrical properties or porosity of the resin,
(d) not cause "stickiness" of the extruder compounded pellets and
(e) provide adequate heat stability during service.

In view of the above noted stringent requirements for a stabilizer useful in cross-linked polyethylene, most of the available stabilizers are not satisfactorily useful for that purpose. In other words, even though some stabilizers may provide adequate stabilization during processing, they are not effective as antioxidants to protect the finished product against oxidative degradation during high temperature service. In other instances, many antioxidants might perform very well in preventing oxidative degradation, but are almost totally consumed during the cross-linking stage. Still others exude to the surface causing "stickiness"! For this reason it is difficult to find one type of a stabilizer which would substantially meet all of the above noted requirements.

The prior art discloses many phenolic stabilizers are in the stabilization of polyethylene including bis(hindered-phenol) sulfides which are closely related to the compounds employed in this invention. Good examples of such prior art are the following U.S. Pats. 2,982,756; 3,057,926; 3,069,384; 3,099,639; 3,148,168; 3,170,893 and 3,250,712. All of these patents disclose the use of sulfur containing phenolic compounds as stabilizers of various substrates including polyolefins such as polyethylene. These patents, however, do not disclose or teach using the specific thiophenolic compounds of this invention and also fail to recognize that there is a special unexpected property possessed by these compounds when used in cross-linked polyethylenes. Furthermore, these patents specifically state that the alkyl hindering groups substituted on the phenol must have at least one branched alkyl group and disclose stabilization of non-cross-linked polyethylene and therefore are not faced with the problems present in the stabilization of cross-linked polyethylenes. U.S. Pat. 2,985,617 discloses the use of an alkyl cresol sulfide such as 4,4'-thiobis-(6-tert-butyl-m-cresol) in a cross-linked polyethylene but the cross-linking is accomplished by irradiation. Thus, in this instance also there is no problem of substantially consuming the stabilizer by the free radicals obtained from the decomposition of the peroxides which occurs in the chemical cross-linking. U.S. Pat. No. 3,296,189 deals specifically with the stabilization of chemically cross-linked polyethylene, but in that patent polymerized trimethyldihydroquinoline is employed as the stabilizer.

DETAILED DISCLOSURE

This invention relates to the stabilization of chemically cross-linked polyethylene with bis(dimethylphenol)sulfides having the structure

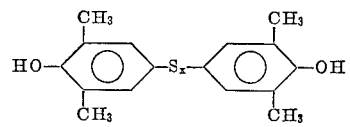

wherein $x$ is an integer from 1 to 4 and preferably from 1 to 3.

The stabilization of the chemically cross-linked polyethylene can be accomplished with any one specific sulfide compound illustrated above or a mixture of such compounds.

The preferred embodiment of this invention for economic reasons is, however, the use of a mixture of the sulfides exemplified by the above formula in stabilizing the chemically cross-linked polyethylene. Illustrative examples of the bis(dimethylphenol)sulfides represented by the above formula are:

(a) bis(3,5-dimethyl-4-hydroxyphenyl)sulfide
(b) bis(3,5-dimethyl-4-hydroxyphenyl)disulfide
(c) bis(3,5-dimethyl-4-hydroxyphenyl)trisulfide
(d) bis(3,5-dimethyl-4-hydroxyphenyl)tetrasulfide The bis(dimethylphenol)sulfides can be prepared by a method described by Hotelling et al., Journal of Organic Chemistry, volume 24, page 1598 (1959). This method is based on sulfurization of a phenol with sulfur monochloride yielding a sulfurization product containing a mixture of monosulfide, disulfide and polysulfide.

By chemically cross-linked polyethylene is meant polyethylene which has been cross-linked with a peroxide and not by irradiation or any other method. The chemically cross-linking polyethylene possesses certain important properties which make it useful in many important applications. This is discussed in greater detail above in the background of the invention.

As already noted above, bis(dimethylphenol)sulfides are especially effective antioxidants of chemically cross-linked polyethylene, protecting the polymer against thermal and oxidative degradation and premature gel formation. It should be noted, however, that said sulfides are also effective stabilizers of polyethylene cross-linked by irradiation. Generally, the stabilization of radiation cross-linked polyethylene is not particularly difficult because this method of cross-linking does not involve generation of large quantities of labile free radicals. Thus, the stabilizer is not subjected to as severe chemical conditions as in chemical cross-linking. It therefore follows that if a stabilizer would perform well in a chemically cross-linked polyethylene it should also perform well in a radiation cross-linked polyethylene. However, since the bis(dimethylphenol)sulfides are unexpectedly very effective as stabilizers of chemically cross-linked polyethylene, the instant invention is directed particularly to such stabilization.

In addition to the antioxidants, the cross-linked polyethylene advantageously may also contain a co-stabilizer.

Especially useful co-stabilizers are dilauryl-β-thiodipropionate and distearyl-β-thiodipropionate.

The following formula represents this co-stabilizer which is in certain instances very useful in combination with the stabilizers of this invention:

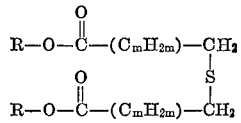

wherein R is an alkyl group having from 6 to 24 carbon atoms; and $m$ is an integer from 1 to 6.

In addition to an antioxidant and co-stabilizer the cross-linked polyethylene may also contain a metal deactivator such as N-salicylidene-N'-salicylhydrazide, malamine, oxanilide, oxalic acid bis(benzilidenehydrazide), and the like; pigments, inorganic fillers or other additives usually employed in such compositions. The cross-linked polyethylene may also contain 3 to 40 percent of carbon black. The carbon black heated polyethylene is particularly useful in wire coating compositions.

The bis(dimethylphenol)sulfides are employed in the amounts of from 0.05% to 1% based on the weight of the polyethylene. The preferred range, however, is from 0.1% to 0.75%. Too little antioxidant provide insufficient end use protection while too much antioxidant adversely affects the degree of cure, electrical properties and pellet stickiness. The actual concentration used will depend on the degree of heat stability desired economics and other factors. As mentioned above, the antioxidants of this invention may also be employed in combination with a co-stabilizer, the latter being usually employed in the amount of from 0.01% to 2% based on the weight of polyethylene.

As noted above, by chemically cross-linked polyethylene is meant polyethylene which has been cross-linked with a peroxide which substantially decomposes at temperatures in excess of 130° C. One type of peroxide contains the structure

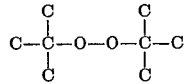

One of the best of the tertiary peroxides used as cross-linking agents is di-alpha-cumyl peroxide. Other peroxides which may be employed in cross-linking polyethylene are disclosed in U.S. Pats. 3,296,189; 3,079,370 and in British Pats. 865,793 and 1,028,235.

As noted above, a mixture of bis(3,5-dimethyl-4-hydroxyphenyl)monosulfide, disulfide and trisulfide can be prepared by a method described by Hotelling et al. The preparation of bis(3,5 - dimethyl-4-hydroxyphenyl)sulfide is described in J. Am. Chem. Soc. 81, 3608–10 (1959). The preparation of the disulfide and the trisulfide compounds are described below.

Example 1.—Preparation of bis(3,5-dimethyl-4-hydroxyphenyl)disulfide

Thirty two grams of 2,6-dimethyl-4-mercaptophenol was dissolved in 400 milliliters of warm carbon tetrachloride and the solution cooled to room temperature. After the addition to the solution of 40 milliliters of water the resulting slurry was stirred and while stirring 23 grams of iodine (sublimed grade) dissolved in 130 milliliters of carbon disulfide was added at such a rate that there was always only a slight excess of iodine in the reaction mixture at any time. A concentrated aqueous solution of sodium betabisulfite was added slowly until the color of the reaction was lemon yellow. The organic phase was then separated and dried over sodium sulfate and magnesium sulfate drying agent, filtered through filtercell and the product melting at 90° to 93° C. was recovered through the clear filtrate.

Example 2.—Preparation of mixed bis(3,5-dimethyl-4-hydroxyphenyl)sulfides 183 g. of 2,6-dimethylphenol, diluted with 750 ml. of carbontetrachloride, and 32 g. of sulfur were placed into the reaction vessel. While stirring, 11.3 g. of sulfur monochloride in 300 ml. of carbontetrachloride was added to the reaction dropwise at 27–29° C., occasionally cooling the vessel. After the addition was completed the reaction mixture was heated at reflux for 30 minutes. The solvent was then distilled under reduced pressure yielding 232 g. of the product. Thin layer chromatography and gas liquid chromatography showed that the product was a mixture of bis(3,5-dimethyl-4-hydroxyphenyl)monosulfide, disulfide and trisulfide and a very small amount of unreacted 2,6-dimethylphenol.

Example 3.—Preparation of bis(3,5-dimethyl-4-hydroxyphenyl)trisulfide

The mixed sulfides prepared in Example 1 was recrystallized twice from acetone. After drying, the trisulfide product had a melting point of 138–140° C.

*Elemental analysis.*—Calcd. for $C_{16}H_{18}O_2S_3$ (percent): C, 56.78; H, 5.36; S, 28.42. Found (percent): C, 56.83; H, 5.38; S, 28.62.

Procedure for oven aging at 150° C. (retention of tensile strength): Stabilizing additives were dissolved in a small amount of acetone and added to unstabilized low density polyethylene pellets (Bakelite DYNH–4) and the pellets allowed to dry overnight. After melt mixing the pellets for four minutes on a two roll thermoplastics mill heated to 135° C., the required amount of previously weighed dicumyl peroxide (Di-Cup) was added to the mill and mixed in for an additional three minutes.

Portions of the milled sheet were compression molded into 75 mil thick plaques by heating in a hinged four cavity, highly polished, rubber mold for 10 minutes at 120° C. under gradually increasing pressure to a maximum of 70 p.s.i.

The resin was subsequently cured (cross-linked) by transferring the mold assembly to a second compression molder heated to 180° C. The mold was heated for 5 minutes at less than 70 p.s.i. pressure and the pressure increased to 290 p.s.i. for an additional 10 minutes. Finally, the mold assembly was transferred to a third water cooled hydraulic press with 345 p.s.i. pressure applied during the entire 5 minute cooling cycle.

Plaques from which tensile bars were to be cut for determination of original tensile and elongation properties were annealed in an oven for 10 minutes at 113° C. Dumbell shaped tensile bars 4½" in length and ¼" wide at the narrow mid section were die punched from the plaques and aged in a forced draft oven at 150° C. for two and four weeks. Tensile strength and percent elongation were determined at these intervals. The test data are reported in Table I.

TABLE I
Cross-Linked Polyethylene: Retention of Physical Properties After Aging at 150° C.

| Example number | Formulation,[a] Concentrations in phr. | Original (unaged) Tensile strength, p.s.i. | Original (unaged) Elongation, percent | Percent retention of original properties after oven aging 2 weeks Tensile | 2 weeks Elongation | 4 weeks Tensile | 4 weeks Elongation |
|---|---|---|---|---|---|---|---|
| 4 | Blank (no stabilizers) | 2,800 | 540 | [b] | | | |
| 5 | 0.2 Compound A | 2,790 | 615 | 88 | 94 | 87 | 89 |
| 6 | 0.5 Compound A | 2,870 | 630 | 96 | 104 | 81 | 87 |
| 7 | 0.75 Compound A | 2,470 | 655 | 106 | 98 | 92 | 87 |
| 8 | 0.2 Compound B | 2,910 | 600 | 83 | 90 | 77 | 84 |
| 9 | 0.2 Compound C | 2,800 | 570 | 87 | 100 | 89 | 96 |
| 10 | 0.2 Compound D | 3,050 | 580 | 85 | 97 | 76 | 89 |
| 11 | 0.1 Compound A plus 0.1 DSTDP | 3,150 | 605 | 77 | 95 | 71 | 91 |
| 12 | 0.1 Compound A plus 0.4 DSTDP | 3,000 | 600 | 90 | 102 | 85 | 97 |
| 13 | 0.2 Compound A plus 0.1 DSTDP | 3,000 | 595 | 91 | 104 | 81 | 97 |

[a] 100 parts DYNH-4, 2 parts Di-Cup R, plus indicated amounts of stabilizers.
[b] Blank decomposes completely in one day.

NOTE.—Compound A is a mixture of bis(3,5-dimethyl-4-hydroxyphenyl) monosulfide and trisulfide; Compound B is bis(3,5-dimethyl-4-hydroxyphenyl) sulfide; Compound C is bis(3,5-dimethyl-4-hydroxyphenyle disulfide; Compound D is bis(3,5-dimethyl-4-hydroxyphenyl) trisulfide; DSTDP is distearylthiodipropionat) (a synergist).

Procedure for gel content determination: Gel content is a measure of the cross-link density achieved during curing. The polyethylene resin, Bakelite DCNH-4, cross-linked with 2.0% dicumyl peroxide was ground and screened through a 60 mesh sieve. About 0.3 gm. was weighed accurately on an analytical balance and securely enclosed in a 100 mesh stainless steel pouch made by folding a 1½" x 3" piece into a 1" square container using staples. The pouch was weighed and submerged in boiling Decalin (193° C.) for 6 hours, after which time it was dried overnight in a vacuum oven at 150° C. and 10 mm. Hg. The pouch was then reweighed to determine weight loss of soluble (uncross-linked) resin. Results are expressed in terms of percent gel, which is the insoluble (cross-linked) portion of the resin. Resins having a minimum of 70% gel content are considered to be cross-linked satisfactorily. The test data are reported in Table II.

TABLE II

| Example number | Formulation (concentrations in phr.) | Percent gel |
|---|---|---|
| 14 | Blank (no stabilizer) | 85 |
| 15 | 0.2 Compound A | 82 |
| 16 | 0.5 Compound A | 71 |
| 17 | 0.75 Compound A | 68 |
| 1a | 0.1 Compound A plus 0.1 DSTDP | 79 |
| 19 | 0.1 Compound A plus 0.4 DSTDP | 77 |
| 20 | 0.2 Compound A plus 0.3 DSTDP | 78 |

What is claimed is:

1. A composition of matter consisting essentially of peroxide cross-linked polyethylene and from 0.05 to 1.0% by weight of polyethylene of a hindered bis-phenol sulfide having the formula

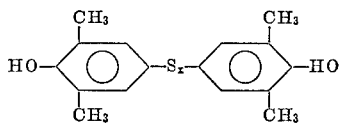

wherein $x$ is an integer from 1 to 4, or a mixture thereof.

2. A composition of claim 1 wherein $x$ is from 1 to 3.
3. A composition of claim 1 wherein the sulfide is bis(3,5-dimethyl-4-hydroxyphenyl)monosulfide.
4. A composition of claim 1 wherein the sulfide is bis(3,5-dimethyl-4-hydroxyphenyl)disulfide.
5. A composition of claim 1 wherein the sulfide is bis(3,5-dimethyl-4-hydroxyphenyl)trisulfide.
6. A composition of claim 1 wherein the hindered bis-phenol sulfide is a mixture of sulfides wherein $x$ is from 1 to 3.
7. A composition of claim 1 containing additionally from 0.01 to 2 percent of a thio co-stabilizer having the formula

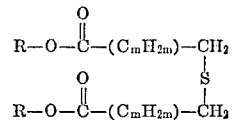

wherein R is an alkyl group having 6 to 24 carbon atoms and $m$ is an integer from 1 to 6.

8. A composition of claim 7 wherein said co-stabilizer is dilauryl-thiodipropionate or distearylthiodipropionate.
9. A composition of claim 6 containing additionally from 0.01 to 2 percent of dilaurylthiodipropionate or distearylthiodipropionate.
10. A composition of claim 2 wherein the concentration of said hindered bis-phenol sulfide is from 0.1 to 0.75%.

References Cited
UNITED STATES PATENTS

| | | | |
|---|---|---|---|
| 3,658,743 | 4/1972 | Bevilacqua | 260—45.95 |
| 3,440,212 | 4/1969 | Tholstrup | 260—45.95 |
| 3,493,538 | 2/1970 | Salyer et al. | 260—45.95 |
| 3,345,328 | 10/1967 | Tholstrup | 260—45.95 |
| 3,398,116 | 8/1968 | Giolito | 260—45.95 |
| 3,335,124 | 8/1967 | Larsen | 260—94.9 |
| 3,449,191 | 6/1969 | Taylor | 260—94.9 |
| 3,661,877 | 5/1972 | Bluestein et al. | 260—94.9 |

DONALD E. CZAJA, Primary Examiner
E. C. RZUCIDLO, Assistant Examinr

U.S. Cl. X.R.
260—45.7 S, 45.95 R